United States Patent

Messina et al.

[15] 3,664,956

[45] May 23, 1972

[54] GREASE COMPOSITIONS

[72] Inventors: Joseph F. Messina, Havertown; Henry Gisser, Philadelphia, both of Pa.

[73] Assignee: The United States of America as represented by the Secretary of the Army

[22] Filed: Sept. 26, 1969

[21] Appl. No.: 861,488

[52] U.S. Cl.............................................252/49.6, 252/58
[51] Int. Cl......................................C10m 7/50, C10m 7/28
[58] Field of Search..........................................252/58, 49.6

[56] References Cited

UNITED STATES PATENTS

| | | | |
|---|---|---|---|
| 3,011,975 | 12/1961 | Nitzsche et al. | 252/58 |
| 3,262,879 | 7/1966 | Messina | 252/58 |
| 3,453,210 | 7/1969 | Wright | 252/58 |

FOREIGN PATENTS OR APPLICATIONS

| | | | |
|---|---|---|---|
| 869,402 | 5/1961 | Great Britain | 252/58 |

*Primary Examiner*—Daniel E. Wyman
*Assistant Examiner*—I. Vaughn
*Attorney*—Harry M. Saragovitz, Edward J. Kelly, Herbert Berl and S. Dubroff

[57] ABSTRACT

Stable grease compositions for use with equipment at extremely low temperatures, the greases consisting of about 69 to 78 weight percent polysiloxanes, the balance being tetrafluoroethylene polymer having a molecular weight of 10,000 — 50,000, a softening point of 321.1 percent, particle size less than 30 microns in diameter, and supplied as a 7.5 percent suspension in trichlorotrifluoroethane.

6 Claims, No Drawings

GREASE COMPOSITIONS

The invention described herein may be manufactured, used, and licensed by or for the Government for governmental purposes without the payment to us of any royalty thereon.

This invention relates to improved lubricants and more particularly concerns grease compositions which are chemically and physically stable over wide temperature ranges for extended periods.

Current grease-type lubricants are generally inoperable over a wide temperature range, especially at extremely low temperatures, and are thus not completely suitable for many potential military applications. For example, where lubricants do not possess physical characteristics which will permit their successful and reliable operation on equipment at extremely low temperatures, serious operational problems are introduced which often necessitates the use of auxiliary heaters to raise ambient temperatures.

It is therefore an object of the invention to provide improved grease compositions which are free of the abovementioned disadvantage.

Another object of the invention is to provide grease compositions which exhibit truly excellent low torque characteristics at extremely low temperatures, good shear and oxidation stability, a low fluid separation and high dropping point.

Other objects and features of the invention will become apparent as the invention is more fully hereinafter disclosed.

Briefly, we have discovered new grease compositions especially useful to the military wherein polysiloxanes are thickened with a perfluoro polymer.

More specifically, we have discovered that polydimethylsiloxane, polymethylchlorophenylsiloxane and hexa(2-ethylbutoxy) disiloxane may be thickened with tetrafluoroethylene (hereinafter referred to as PTFE) polymer having a molecular weight of about 10,000 - 50,000 to produce a stable, grease-type lubricant for military applications, among others.

Typical properties of the PTFE solids used in the preparation of our inventive compositions are:
a softening point of 321.1° C
a particle size under 30 microns in diameter, the PTFE solids being a supplied as a 7.5 percent suspension in trichlorotrifluoroethane.

The viscosities of the base fluids, determined at 37.78° C are as follows:

TABLE I

Viscosity of Base Fluids at 37.78° C

| Siloxane | Viscosity, Centistokes |
| --- | --- |
| Polydimethylsiloxane | 245 |
| Polymethylchlorophenylsiloxane | 57 |
| hexa(2-ethylbutoxy) disiloxane | 11.7 |

The greases were prepared as follows:

The dispersion of PTFE in trichlorotrifluoroethane was heated on a steam bath until 50–75 percent of the solvent evaporated. Approximately 75 percent of the required quantity of one of the three aforementioned polysiloxanes was then added, the mixture was stirred and heating continued until all the trichlorotrifluoroethane had evaporated. The trichlorotrifluoroethane was analyzed by gas chromatography using the following technique. A sample of the grease mixture was eluted using C.P. benzene. The eluted fluid mixture was placed in a gas chromatograph with a 20 feet carbowax 20 M column at 50 C and a helium gas flow of 10ml per minute. Absence of a retention peak after 3.3 minutes indicated that all of the trichlorotrifluoroethane had evaporated. The remainder of the polysiloxane was then added while stirring, and stirring continued until a homogeneous grease-like product was obtained. The mixture was cooled to room temperature and passed through a colloid mill with the stator-to-rotor clearance set at 0.001 in. The homogenized mixture was then placed in a freezer at minus 10 C for 24 hours, removed and permitted to remain at room temperature an additional 24 hours prior to use. At least two batches of each grease were prepared. The thickener content was determined in duplicate on each batch using a Soxhlet extractor and benzene. The data are presented in Table II below:

TABLE II

GREASE COMPOSITIONS

| Base Fluid | | | PTFE Thickener. |
| --- | --- | --- | --- |
| Name | wt. % | Pour Point | wt. % |
| Polydimethylsiloxane | 73.0 | <−53.9°C | 27.0 |
| Polymethylchlorophenylsiloxane | 76.1 | <−53.9°C | 23.9 |
| Hexa(2-ethylbutoxy) disiloxane | 73.0 | <−53.9°C | 22.0 |

The PTFE thickener content above represents a minimum concentration necessary to provide a stable grease-like structure. If less than the amount above is used, a semifluid consistency usually results. The effective range of base fluid is presented in Table III below:

TABLE III

GREASE COMPOSITIONS

| Base Fluid | Effective Range, wt. % |
| --- | --- |
| Polydimethylsiloxane | 69.0–73.0 |
| Polymethylchlorophenylsiloxane | 71.8–76.1 |
| Hexa(2-ethylbutoxy) disiloxane | 73.0–78.0 |

Shear stability tests were conducted using the one-quarter scale (ASTM D 1403–62) grease worker modified to permit automatic operation. In Table IV below, the values representing double strokes, the maximum change in consistency is 82 units (one unit = one tenth of a millimeter) for the hexa(2-ethylbutoxy) disiloxane. The polymethylchlorophenylsiloxane yielded a remarkable 4 unit change only. After 6 month's storage, the change in worked consistency on the stored samples was not significantly different than the change on the unstored samples. The table indicates that the polysiloxane PTFE thickened greases were shear stable, and that this property would not change significantly with passage of time. All values presented in Table IV thru VII were obtained on grease compositions having the specific proportions as stated in Table II above.

TABLE IV

SHEAR STABILITY

| GREASE | STROKES | | | |
| --- | --- | --- | --- | --- |
| | 0* | 500 | 10,000 | 100,000 |
| Polydimethylsiloxane | 264 (264)** | 278 (281) | 283 (290) | 302 (313) |
| Polymethylchlorophenylsiloxane | 310 (319) | 309 (327) | 311 (343) | 314 (350) |
| Hexa(2-ethylbutoxy) disiloxane | 328 (336) | 328 (338) | 380 (373) | 410 (406) |

*Unworked, no strokes
**Data in parenthesis are values obtained after 6 months storage In comparison therewith, prototype grease composition used currently by all military services of the U.S. Government, other than for chassis lubrication, is a diester mixture base grease including additives and lithium hydroxystearate, MIL–G–23827 A, Aug. 1 1965, and yielded 270 units at 0 strokes and 375 units at 100,000 strokes, a difference of 105, or considerably poorer than our inventive compositions.

Fluid separation was low. The bleeding values in Table V below were corroborated by visual observations on test samples stored in the laboratory from 6 to 12 months.

TABLE V

FLUID SEPARATION AND DROPPING POINT

| GREASE | Bleeding, wt. %* | Dropping Point, °C** |
| --- | --- | --- |
| Polydimethylsiloxane | 3.4 | 233.5 |
| Polymethylchlorophenylsiloxane | 4.1 | 238.0 |
| Hexa(2-ethylbutoxy) disiloxane | 2.5 | 249.0 |

*Fed. Std. Test Method 321.2 (Fed. Std. Test Method 791b, 1966), 100°C for 30 hours.
**ASTM D 2265–67.

Our greases exhibited a high dropping point (temperature at which the first drop of material falls from the cup), a property useful for high temperature applications.

In comparison therewith, prototype grease composition used currently by all military services of the U.S. Government, other than for chassis lubrication, is a diester mixture base grease including additives and lithium hydroxystearate, MIL–G–23827 A, Aug. 1 1965, yielded 5.0 weight percent bleeding and a dropping point of about 163° C, considerably inferior to our grease compositions.

Torque data in Table VI below were obtained using ASTM D 1478 – 63 slightly modified through the use of a 5-lb weight on the outer race of the 204 ball bearing to eliminate skidding of the balls. The data clearly demonstrate that our grease compositions exhibit admirably low torques at −53.9° C or −65° F. This characteristic is vital to our military, since any reduction or elimination of auxiliary equipment required for starting operations is highly desirable.

TABLE VI

Torque (g–cm) at −53.9°C

| GREASE | Starting | Running |
| --- | --- | --- |
| Polydimethylsiloxane | 178 | 125 |
| Polymethylchlorophenylsiloxane | 154 | 85 |
| Hexa(2-ethylbutoxy) disiloxane | 340 | 85 |
| MIL–G–A | 3825 | 850 |

The data in Table VII below show the vastly superior oxidation stability of our greases, having no oxidation inhibitors added thereto, when compared to grease 23827 (MIL–G–23827 A, Aug. 1 1965) which grease requires the presence of an oxidation inhibitor.

TABLE VII

OXIDATION STABILITY*

| GREASE | Pressure Drop (lb/sq. in.) |
| --- | --- |
| Polydimethylsiloxane | 1.0 |
| Polymethylchlorophenylsiloxane | 0.5 |
| Hexa(2-ethylbutoxy) disiloxane | 10.0 |

*ASTM D 942–50 (100 hours at 121.2°C).

We wish it to be understood that we do not desire to be limited to the exact details described, for obvious modifications will occur to a person skilled in the art.

We claim:

1. A homogeneous grease composition consisting essentially of a major proportion of a polysiloxane, said polysiloxane being selected from the group consisting of polydimethylsiloxane, polymethylchlorophenylsiloxane, and hexa(2-ethylbutoxy) disiloxane; and a thickening amount of tetrafluoroethylene polymer having a molecular weight between about 10,000 to 50,000 and a particle size less than about 30 microns in diameter 2. The composition of claim 1 wherein said polysiloxane has a pour point of less than −65° F.

3. The composition of claim 1 wherein said polydimethylsiloxane comprises about 69.0 to 73.0 weight percent of said grease composition, the balance being substantially tetrafluoroethylene polymer having a molecular weight between about 10,000 to 50,000 and a particle size less than about 30 microns in diameter.

4. The composition of claim 1 wherein said polymethylchlorophenylsiloxane comprises about 71.8 to 76.1 weight percent of said grease composition, the balance being substantially tetrafluoroethylene polymer having a molecular weight between about 10,000 to 50,000 and a particle size less than about 30 microns in diameter.

5. The composition of claim 1 wherein said hexa(2-ethylbutoxy) disiloxane comprises about 73.0 to 78.0 weight percent of said grease composition, the balance being substantially tetrafluoroethylene polymer having a molecular weight between about 10,000 to 50,000 and a particle size less than about 30 microns in diameter.

6. A homogeneous grease composition exhibiting excellent torque properties at −65° F, good shear and oxidation stability, low bleeding and a high dropping point, comprising a major proportion of a polysiloxane having a pour point less than −65° F, and a thickening amount of tetrafluoroethylene polymer having a molecular weight ranging between and about 10,000 to 50,000 and a particle size of less than 30 microns in diameter, said polysiloxane being selected from the group consisting of about 69.0 to 73.0 weight percent polydimethylsiloxane, 71.8 to 76.1 weight percent polymethylchlorophenylsiloxane, and 73.0 to 78.0 weight percent hexa(2-ethylbutoxy) disiloxane.

* * * * *